May 5, 1970  N. C. NIELSEN  3,510,357
THERMALLY ACTIVATED AMMONIA VAPOR BATTERY
Filed May 5, 1967  3 Sheets-Sheet 2

Inventor
Niels C. Nielsen
By Hibben, Noyes & Bicknell
Attorneys

May 5, 1970  N. C. NIELSEN  3,510,357
THERMALLY ACTIVATED AMMONIA VAPOR BATTERY
Filed May 5, 1967  3 Sheets-Sheet 3

Inventor
Niels C. Nielsen
By Hibben, Noyes & Bicknell
Attorneys

United States Patent Office 3,510,357
Patented May 5, 1970

3,510,357
THERMALLY ACTIVATED AMMONIA VAPOR BATTERY
Niels C. Nielsen, Lexnigton, Ill., assignor to National Union Electric Corporation, Stamford, Conn., a corporation of Delaware
Filed May 5, 1967, Ser. No. 636,371
Int. Cl. H01m 21/08
U.S. Cl. 136—86                    8 Claims

ABSTRACT OF THE DISCLOSURE

A thermally activated ammonia vapor battery assembly comprising one or more cells using any conventional anode and cathode materials as the electrodes, and having in combination therewith an electrolyte element of solid electrically non-conductive, ammonia-absorbing material which becomes ionically conductive when exposed to gaseous ammonia and a nitrogen-containing material which releases gaseous ammonia when heated. The heat requirements for effecting the release of gaseous ammonia in situ in the battery cell assembly are provided by heating in an oven or by including in the battery assembly a quantity of heat-release material.

---

The present invention relates generally to a reserve-type primary battery or cell which is thermally activated, and more particularly to a thermally activated ammonia vapor battery, the electrolyte composition of said battery, and the method of generating electricity with said electrolyte composition.

Heretofore, ammonia vapor activated batteries have been constructed with a liquid ammonia reservoir outside of the battery cell assembly and consequently must have means for generating and conveying ammonia vapor into the interior of the cell assembly where it condenses on an electrolyte salt capable of absorbing ammonia gas and forming an ionically conductive electrolyte solution. In the prior art ammonia vapor activated batteries, the ammonia reservoir and the means associated therewith for generating and conveying ammonia gas from the reservoir into the interior of the battery or cell have comprised a substantial proportion of the space and weight thereof. In certain battery applications where the space and weight limitations are of critical importance, the size and weight of the prior ammonia vapor batteries have been a serious deterrent to their use, although in other respects ammonia vapor activated batteries have very desirable properties.

It is, therefore, an object of the present invention to provide an improved reserve-type ammonia vapor battery.

It is another object of the present invention to provide an improved reserve-type ammonia vapor activated battery which has reduced space and weight requirements.

It is a further object of the present invention to provide an improved reserve-type ammonia vapor activated battery which does not require a liquid ammonia reservoir.

It is still another object of the present invention to provide an improved electrolyte composition for a reserve-type ammonia vapor activated battery.

Another object of the present invention is to provide an improved method of generating electricity by means of an ammonia vapor activated battery.

Other objects of the present invention will be apparent to those skilled in the art from the following detailed description and claims to follow, when read in conjunction with the accompanying drawing, wherein:

It has been discovered that an improved reserve-type ammonia vapor activated battery can be made without a separate liquid ammonia reservoir outside the cell assembly by providing in a battery assembly an electrolyte element comprising a solid normally electrically non-conductive electrolyte compound or salt which absorbs gaseous ammonia to form an ionically conducting electrolyte solution and having associated therewith a solid nitrogen-containing material which on heating will release gaseous ammonia in situ within the battery cell assembly for absorption by the dry electrolyte material and thereby forming an ionically conducting electrolyte solution. The solid nitrogen-containing material is incorporated in the battery cell assembly in an amount to provide when heated sufficient ammonia vapor to transform the normally dry electrically non-conductive ammonia-absorbing compound or salt into an ionically conductive electrolyte. While the solid nitrogen-containing material which releases ammonia gas on heating is preferably directly combined with the electrolyte element within the cell, it is also possible, and in some instances preferred, to include the ammonia-releasing material in one or more of the other elements of the cell, such as the anode or cathode of the cell admixed with each of the elements of the cell, or formed as an independent layer or pellet of solid nitrogen-containing material.

It has also been discovered that the battery assembly having the combination of a solid ammonia-absorbing electrolyte material and a solid ammonia-releasing material can be further improved by including within the battery assembly a small amount of a heat release material, such as a pellet of pyrotechnic material, which is capable of heating the solid nitrogen-containing material and effecting release of ammonia gas from the solid nitrogen-containing material.

More particularly, the ammonia vapor activated battery of the present invention is comprised of one or more interconnected cell units, each consisting of an anode, a cathode, and an electrolyte element preferably sealably enclosed in a casing of any suitable configuration or design. The anode element of the cell can be any of the conventional anode materials, including the usual magnesium, silver, zinc or lead, but can also be any substance capable of being oxidized in an electrolyte solution. The anode can be in the form of a metal or metal alloy plate or layer, or formed of compressed powdered metal or metal alloy or other anode material in a finely divided form, including one or more of any of the conventional anode materials mixed with the solid nitrogen-containing material of the present invention.

The cathode element of the cell can be any of the conventional cathode materials including the usual mercuric sulfate, copper, manganese dioxide, meta-dinitrobenzene, or lead dioxide, but can also be any substance capable of being reduced in an electrolyte solution. The cathode can be used in the form of a cathode metal or cathode metal alloy sheet or layer or can be formed of compressed powdered cathode material, including one or more of any of the conventional cathode-forming materials used in the battery art, mixed with the solid nitrogen-containing material of the present invention and/or an inert binder. When forming the cathode by compressing a powdered material, it is usually necessary to mix a minimal amount of an inert binder material with the powdered cathode material so that the binder forms the discontinuous phase of a matrix which holds the powdered cathode material together as a unitary mass. Among the inert binder materials which can be used are natural and synthetic powdered waxes, such as "Carbowax," powdered thermosetting plastics, vegetable and animal adhesives, any of the other binder materials used in the battery art. Where not specified otherwise, the binder used in the specific embodiments described herein consisted of powdered wax.

The electrolyte element of the cell which is disposed between and in electrical contact with the anode and cathode elements of the cell is present in the form of a dry compressed mass of solid powdered material normally electrically non-conductive, but which on being contacted with sufficient gaseous ammonia is transformed into an electrically conductive solution or slurry. Salts having the foregoing properties are commonly designated as Divers salts and form an absorption of gaseous ammonia Divers liquids or solutions, in accordance with well known physical chemical reactions.

The electrolyte element of the present invention is preferably comprised of a solid electrolyte compound or salt of the type which is used in the presently known ammonia vapor activated batteries and includes the alkali metal thiocyanates, sodium thiocyanate and potassium thiocyanate, ammonium thiocyanate; the alkali metal nitrates, sodium nitrate, potassium nitrate and lithium nitrate; the amine salts of quadrivalent elements such as thorium chloride, zirconium chloride, and tin iodide, all of which becomes ionically conductive liquids when contacted with sufficient gaseous ammonia.

The electrolyte element of the cell, with or without solid nitrogen-containing material directly admixed therewith, is formed by taking a finely divided dry salt which on contacting with ammonia gas is capable of absorbing ammonia to form an electrolyte solution and compressing the salt at a sufficiently high pressure to form a dense pellet which does not exhibit any significant reduction in volume when contacted with gaseous ammonia so that the electrodes of the cell remain in intimate contact with the electrolyte element when the battery is activated, and preferably without requiring a clamp or the like pressure means being used to maintain the electrodes in contact with the electrolyte when the battery is activated. Unless the electrolyte element and the associated battery components are enclosed in a container which can be sealably closed and which is capable of withstanding the gas pressure generated within the battery, it is desirable to apply a clamp, such as a C-clamp or laboratory pinch clamp, to the ends of the assembly to hold the battery parts in assembled relationship.

The quality of materials used to form the anode, cathode, and electrolyte elements of the battery is determined for any given combination of cell elements by the voltage and current characteristics required by the battery and can be calculated by one skilled in the battery art from data readily available.

It is essential in the present invention that at least one of the battery elements or parts of the battery assembly have associated therewith, either integrally or as a part contiguous therewith, a quantity of solid nitrogen-containing material which is adapted to release on heating sufficient gaseous ammonia in situ to effect transformation of the solid non-conductive electrolyte salt comprising the electrolyte element of the cell into an ionically conductive electrolyte solution or slurry. The gaseous ammonia-producing dry solid nitrogen-containing material can be in a finely divided form admixed with one of the cell elements or disposed as a pellet in contact with one of the cell elements within the battery and is preferably in close proximity to the electrolyte element.

The solid nitrogen-containing material used in the present invention can produce the required gaseous ammonia in situ by thermal decomposition thereof or by means of a thermally initiated chemical reaction between the nitrogen-containing material and a compound admixed therewith. Among the gaseous ammonia producing compounds which are useful in the present invention are the heat decomposable ammonium salts, such as ammonium carbonate, ammonium acid carbonate; and the ammonium double salts, such as magnesium chloride·ammonium chloride and zinc chloride·ammonium chloride.

Gaseous ammonia can also be produced in situ by thermal decomposition of an ammoniated salt or an amine coordination compound which has the general formula, $MY \cdot xNH_3$, where MY is any ionic or covalent compound known to form either a stable amine complex or an ammoniated compound, and $x$ is the number of moles of ammonia per mole of MY. Examples are: $[Cr(NH_3)]Y_z$, and $[Cu(NH_3)_4]Y_4$, etc., in which $z$ multiplied by the anion charge will numerically equal the charge of the complex cation. Other examples are: $PCl_3.8NH_3$, $SbCl_5.6NH_3$, $MnI_2.6NH_3$, $MgI_2.6NH_3$, $FeSO_4.6NH_3$, and $CdSO_4.6NH_3$.

While the thermal decomposition of a normally stable ammonium compound is the preferred direct internal source of gaseous ammonia, it is also possible to obtain gaseous ammonia in situ by having co-present with an ammonium compound of the foregoing types a compound providing a hydroxyl group ($OH^-$), such as the alkali metal hydroxides, sodium and lithium hydroxide, and the like compounds. When a suitable ammonium compound and a suitable hydroxy compound are at normal room temperature or below, there is no ammonia gas produced, but on heating the compounds a chemical reaction takes place resulting in the production of ammonia gas.

It is also within the scope of the present invention to produce the required ammonia gas in situ by means of a thermally initiated reaction between other chemical compounds within the battery cell. For example, one reaction which can be used to produce gaseous ammonia is the reaction between a metal nitride, such as magnesium nitride, and a proton donor, such as potassium acid phosphate or magnesium chloride hexahydrate.

When the ammonia-producing material is formed as a separate pellet of powdered material, it is common practice to mix an inert binder therewith which forms the discontinuous phase of a matrix to hold the finely divided ammonia-producing material(s) together. Binders which can be used include powdered waxes, powdered thermosetting plastics, and any of the other binders commonly used in the battery art.

For a particular battery application an ammonium salt or mixture of salts can be selected which will thermally decompose or react at a suitable activation temperature to yield gaseous ammonia, and at a temperature below the melting point or the decomposition temperature of the particular ammonia-absorbing salts forming the electrolyte element of the battery cell.

The amount of ammonia-producing material which should be admixed with the battery element or elements or used in a separate pellet disposed within the battery casing contiguous with one of the elements thereof to effect transformation of the nonconducting, ammonia-absorbing solid electrolyte salt into an electrically conducting electrolyte solution can be readily calculated by one skilled in the art from the properties of the electrolyte salt and the mass of the electrolyte salt present. An amount of ammonia-producing material slightly in excess of the theoretical equivalent amount should preferably be used.

The heat required for generating gaseous ammonia in situ within the battery cell can be provided by means external to the battery cell, as by heating in an oven, by providing a heating coil on the exterior of the battery casing, or by providing a heat generating means or heat-release means disposed in the battery cell assembly. One internal heat source which can be used in the present invention is a pyrotechnic material in the form of a sheet or pellet disposed within the battery container proximate to the ammonia-producing material. A suitable fuse element and/or primer, which usually has as the active agent thereof the same composition used in the heat-release means, is provided to ignite the pyrotechnic material.

Among the suitable heat-generating means which can be disposed in a battery assembly of the present invention are the compositions disclosed in Modern Pyrotechnics by Herbert Ellern, published by Chemical Publishing Co., Inc., 1961; and including the following:

(1)

| | Percent by weight |
|---|---|
| Zirconium-nickel alloy | 54 |
| Barium chromate | 31 |
| Potassium perchlorate | 15 |

(2)

| | |
|---|---|
| Amorphous boron | 5–10 |
| Barium chromate | 90–95 |

(3)

| | |
|---|---|
| Manganese | 44 |
| Barium chromate | 3 |
| Lead chromate | 53 |

(4)

| | |
|---|---|
| Manganese | 37 |
| Barium chromate | 20 |
| Lead chromate | 43 |

(5)

| | |
|---|---|
| Manganese | 33 |
| Barium chromate | 31 |
| Lead chromate | 36 |

The selection of a particular pyrotechnic composition and the amount of the particular composition used in a given battery assembly will, of course, depend on the decomposition temperature or reaction temperature of the ammonia-producing material used, the amount of such material, and on the mass and specific heat of the other components forming the battery assembly. The required amount of heat-releasing material can be calculated by one skilled in the art from data given in handbook and textbooks which are readily available to those skilled in the art. For a battery having the structure and composition as shown in specific Example 6, release of about 200 calories is sufficient to activate the cell with the electrolyte element of a diameter of about 0.75 inch.

Since it is only necessary to heat the ammonia-releasing material up to its thermal decomposition temperature or the temperature at which a chemical reaction is initiated, the heat releasing means need not continue to generate heat for the duration of the life of the battery. It is not necessary, however, to provide elaborate heat insulation for the battery assembly in order to conserve heat, since the amount of heat which can be released by a small amount of the readily available heat-release materials is entirely adequate. One thermal insulation problem presented, nevertheless, is providing adequate protection for the environment outside the battery against overheating immediately following the "firing" of the heat-release material when the battery is activated.

Figures 1, 1A:
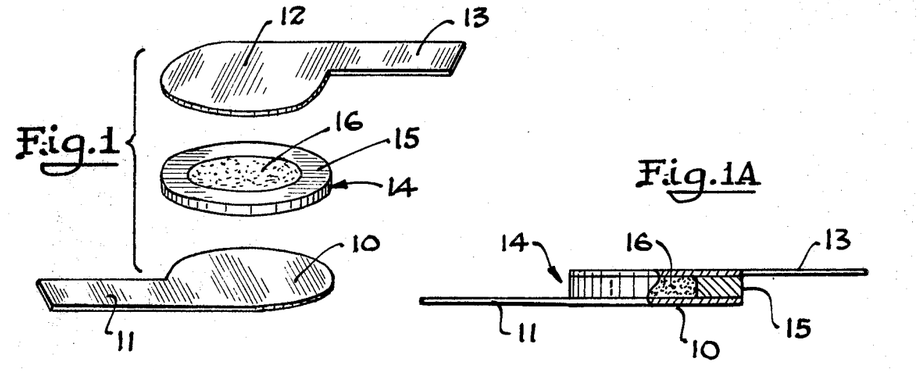
FIG. 1 is an exploded schematic diagram of the elements of a single cell reserve-type ammonia vapor activated battery embodying the present invention.
FIG. 1A is a schematic diagram of the battery of FIG. 1 showing the battery elements in operative relationship.

A simple reserve-type battery structure embodying the present invention is schematically shown in FIGS. 1 and 1A of the drawing and comprises a single cell having a metallic anode element 10 in the form of a generally circular magnesium disc with an outwardly extending section 11 which serves as one electrical contact for the cell, a cathode element 12 in the form of a generally circular copper disc having an outwardly extending section 13 which serves as the other electrical contact for the cell, and an electrolyte unit 14 disposed between the anode 10 and cathode 12 with an electrolyte element 16 in direct contact with the anode 10 and cathode 12. The electrolye unit 14 is comprised of a circular non-conductive ring 15 of silicone glass laminate disposed between the anode 10 and cathode 12 with a circular axial passage. The circular passage of the silicone glass laminate ring 15 retains therein the solid electrolyte element 16 comprised of an intimate admixture of an electrolyte salt which is capable of being solubilized by ammonia vapor and a suitable heat-activated ammonia-producing material, as previously described. The anode element 10 and the cathode element 12 of the cell are held in contact with the opposite lateral surfaces of the electrolyte element 16 by sealably enclosing the three cell elements, as by sealably wrapping in electrical tape (not shown). A cell having the foregoing structure is activated by placing the cell in a heated oven maintained at a temperature sufficiently high to effect release of gaseous ammonia from the ammonia-producing material.

Figures 2, 2A:
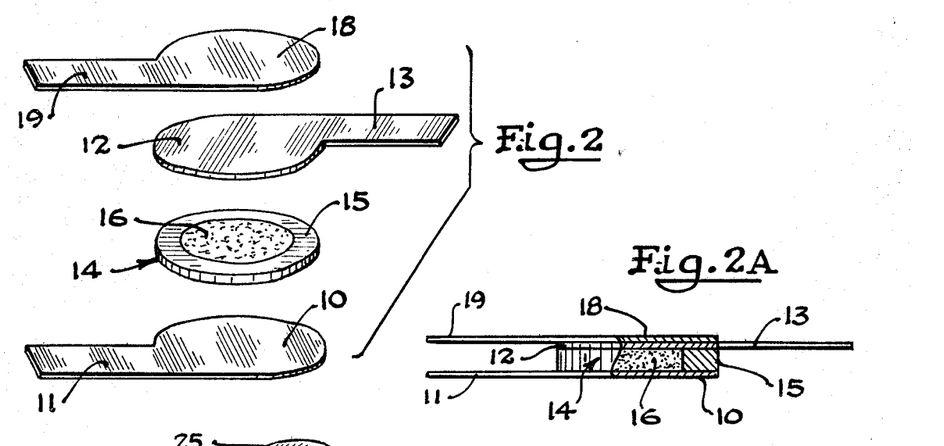
FIG. 2 is an exploded schematic diagram of a modified form of reserve-type battery shown in FIG. 1.
FIG. 2A is a schematic diagram of the battery of FIG. 2 showing the battery elements in operative relationship.

Another simple reserve-type battery structure embodying the present invention is schematically shown in FIGS. 2 and 2A of the drawing and comprises the same cell elements as shown in FIGS. 1 and 1A but having included a heat-producing element 18 in the form of a disc of substantially the same size as the copper cathode 12. The heat-producing element 18 is provided with an outwardly extending fuse section 19 to facilitate igniting the pyrotechnic material of the heat-producing element 18.

Figure 3:
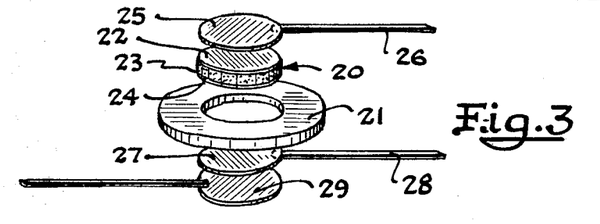
FIG. 3 is an exploded schematic diagram of still another modified form of the reserve-type battery shown in FIG. 1.
Figure 3A:
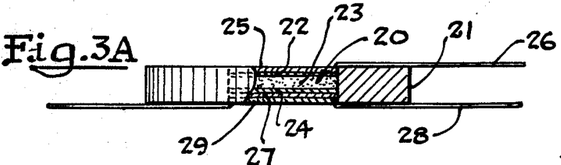
FIG. 3A is a schematic diagram of the battery of FIG. 3 showing the battery elements in operative relationship.

Another form of a single cell reserve-type battery embodying the present invention is schematically shown in FIGS. 3 and 3A of the drawing, wherein the individual cell elements are included in a unitary pellet 20 having three distinct layers with the pellet 20 disposed in a circular opening formed in a silicone ring 21. The three-layered pellet 20 is formed by introducing a powdered anode material in a suitable die to form the anode layer 22, introducing powdered electrolyte material into the die over the anode layer 22 to form an electrolyte layer 23, and finally introducing powdered cathode material into the die over the electrolyte layer 23 to form the cathode layer 24 and compressing to provide the three-layer pellet. The ammonia producer may be included in any layer or as a separate added layer. After the three-layered pellet 20 is inserted into the opening in the silicone glass laminate ring 21, an electrically conductive metal disc 25 having a lead 26 extending outwardly is placed in contact with the anode layer 22 of the pellet 20 and a second metal disc 27 with lead 28 extending outwardly is placed in contact with the cathode layer 24 of the pellet. A heat-releasing material in the form of a disc 29 with an outwardly extending fuse section is preferably placed in contact with the surface of one of the metal discs. The foregoing assembly is then compressed tightly and sealably enclosed in a suitable container or covering such as vinyl electrical tape (not shown).

A reserve-type battery comprising a plurality of interconnected cells of the type described above is schematically shown in FIG. 4 of the drawing, wherein several interconnected cells are positioned within an outer cylindrical container or casing 30 formed of steel or other suitable electrical conductive metal, which may be enclosed in plastic (not shown), with the upper end of the casing being substantially unobstructed and having the lower end closed by an end wall 32. An electrical and thermal insulating sleeve member 33 is fitted inside the container 30 in contact with the inner lateral wall surface thereof. The insulating sleeve member 33 prevents the battery cells coming into electrical contact with the electrical conducting casing 30 and also reduces heat released from within the battery casing when the cells are activated. Within the sleeve member 33 are arranged the interconnected cell units 34, 35, 36 and 37, with each of the cell units being comprised of three superimposed layers of cell elements. The electrically conducting metal discs or cell connector plates 38, 39 and 40 are disposed in electrically conductive contact between cell units 34, 35, 36 and 37, respectively. The lower surface of the bottom cell unit 34 is in electrical contact with the end wall 32 of the casing 30 which serves as the negative pole of the battery assembly.

Figures 4, 5, 6:
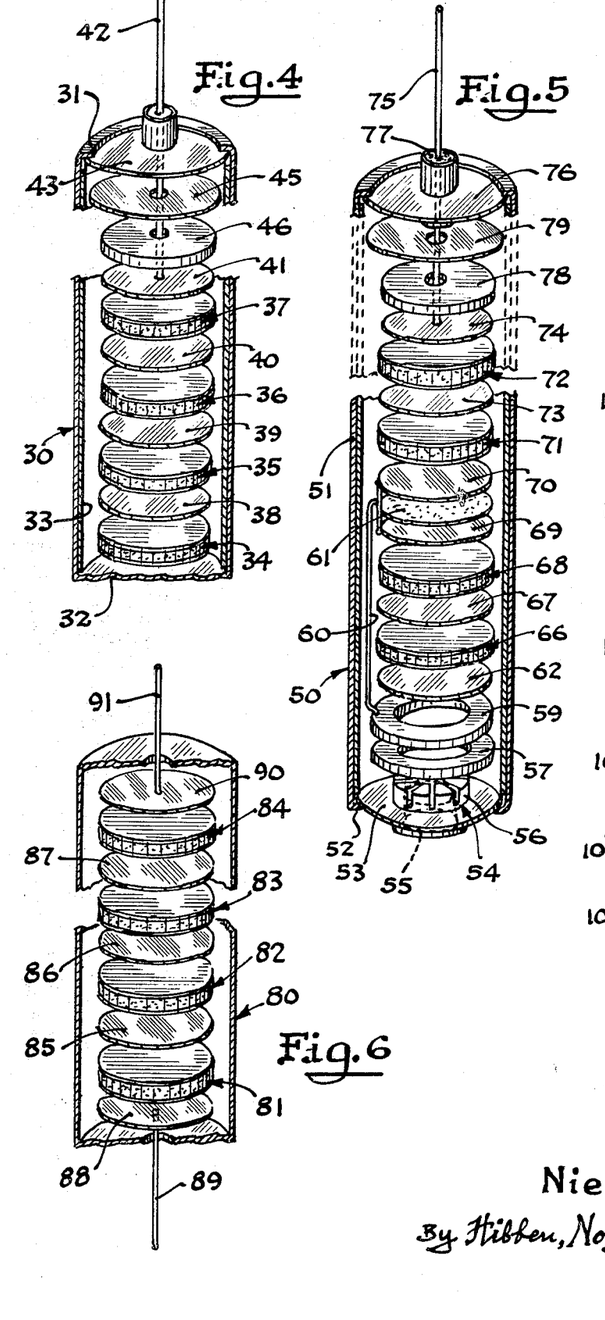
FIG. 4 is an exploded schematic diagram of a modified form of an ammonia vapor activated battery showing the cell elements and casing of a multiple cell structure embodying the present invention.
FIG. 5 is an exploded schematic diagram of a further modified form of the multiple cell battery shown in FIG. 4.
FIG. 6 is an exploded schematic diagram of still another modified form of the multiple cell battery shown in FIG. 4.

Each of the cell units 34, 35, 36 and 37 is comprised of an anode element, a cathode element, and an electrolyte element having the structure and composition shown for the three-layered pellet of FIG. 3.

The upper surface of cell unit 37 has an electrically conductive lead-out member 41 having an axially extending conducting member 42 which is electrically insulated from the remainder of the battery structure and which extends through a cover member 43 sealably closing the upper end of the battery. Insulating filler discs 45 and 46 are disposed between the upper surface of an electrical conducting plate 41 and the cover member 43, and the cover member 43 is held in sealable engagement with insulating filler discs 45 and 46 by an inwardly turned flange 31 formed at the upper end of the container wall 30. The lead-out member 42 can be enclosed or wrapped with electrical insulation material, such as a sheet of mica. The tubular end of the cover member 43 is soldered or otherwise closed to form a gas seal.

The battery having the foregoing structure is activated by external heating means, as by heating the battery in an oven to a sufficient temperature and for a sufficient time to effect release of ammonia vapor in situ within each cell unit. If desired, however, the foregoing structure can be modified by providing a heat generating material or element within the insulating sleeve 33 and/or cell assembly.

In FIG. 5 of the drawing is schematically shown a modified form of battery embodying the present invention and having a plurality of interconnected cell units and an internal heating source. The main body section of the battery comprises a generally cylindrical container 50 of steel or other suitable electrical conductive material having an upper end which is substantially unobstructed and a lower end substantially closed by an end wall 52 with an insulating sleeve 51 disposed therein in contact with the inner surface thereof. The end wall 52 has a flanged passageway 53 for receiving a primer assembly 54 which comprises a cylindrical primer pellet 55 formed of heat-releasing material held so as to extend axially into the interior of the container 50. The primer pellet 55 is held by a flanged cup-shaped primer holder 56 which extends into the lower end of the container 50. The lateral and inner end walls of the cup-shaped primer holder 56 are cut to provide passages extending therethrough which facilitate the primer pellet 55 directly igniting a ring 59 of heat-releasing material mounted about the holder 56 adjacent the upper end thereof. A spacer ring 57 formed of asbestos is mounted about the holder 56. The combustible ring 59 is connected by a strip 60 of combustible material to a disc 61 formed of similar heat-releasing material which is spaced axially from disc 59.

A metal conductor plate 62 is disposed over the end of the primer pellet 55 and is connected by suitable conductor means to the metal casing 50 which serves as the negative electrode of the battery. A battery cell unit or pellet 66 of the type illustrated in FIGS. 3 and 3A of the drawing is mounted within the container 50 with the lower surface of the cell 66 in electrical contact with a metal conductor disc 67. A second cell unit 68 is mounted above cell 66 with its lower surface in electrical contact with the metal conductor disc 67 and having the upper surface thereof in electrical contact with a metal conductor disc 69. The metal disc 69 preferably forms one end section of a dumbbell-shaped member with the other disc-shaped end section 70 thereof being folded over so as to enclose between the respective disc-shaped end sections 69, 70, the disc 61 of heat-release material. The dumbbell-shaped sections which are preferably formed of stainless steel or other suitable electrically conductive metal serve to connect electrically in series the cell units 68 and 71. The cell units 71 and 72 are electrically connected in series by a metal disc 73 which is disposed between the cells. The upper surface of the cell 72 is in electrical contact with a metal conductor disc 74. The disc 74 has a lead-out element 75 which extends axially outwardly through a cover member 76 having a tubular passage 77 extending outwardly. The tubular passage 77 is soldered or otherwise closed to form a gas seal at the upper end of the container 50. The space between the upper surface of the disc 74 and the cover member 76 is filled with insulating filler material or rings, such as one or more silicone glass laminate rings 78 and asbestos rings 79 so that there are no voids within the container 50. The lead-out section 75 is preferably wrapped with electrical insulation material.

If desired, additional cell units can be arranged in series with the cells 66, 68, 71 and 72 with one or more interconnected sections of heat-release material at spaced points within the container. Also, three or more interconnected cells can be arranged in contiguous relationship, instead of the two cells as illustrated, and a heat-release disc of suitable size can be disposed between each series of cells to provide the required amount of heat to effect generating the required amount of ammonia vapor within each of the cell units.

A modified form of a battery embodying the present invention and having a plurality of interconnected cell units activated by external heating means is schematically shown in FIG. 6 of the drawing. Within an outer cylindrical container or casing 80 formed of silicone or other suitable electrically non-conductive material are arranged the cell units 81, 82, 83 and 84 with each of the cell units being comprised of three superimposed layers or cell elements. Each of the cell units 81, 82, 83 and 84 is comprised of an anode element, a cathode element, and an electrolyte element, preferably having the structure and composition shown for the three-layered pellet of FIG. 3. The electrically conducting metal discs or cell connector plates 85, 86 and 87 are disposed in electrically conductive contact between cell units 81, 82, 83 and 84, respectively. The lower surface of the bottom cell unit 81 is in electrical contact with an electrically conductive lead-out member 88 having an extending conducting member 89 which extends through a sealable outer covering (not shown). The upper surface of cell unit 84 has an electrically conductive lead-out member 90 having an outwardly extending conducting member 91 which extends through a sealable outer covering (not shown).

Figure 7:
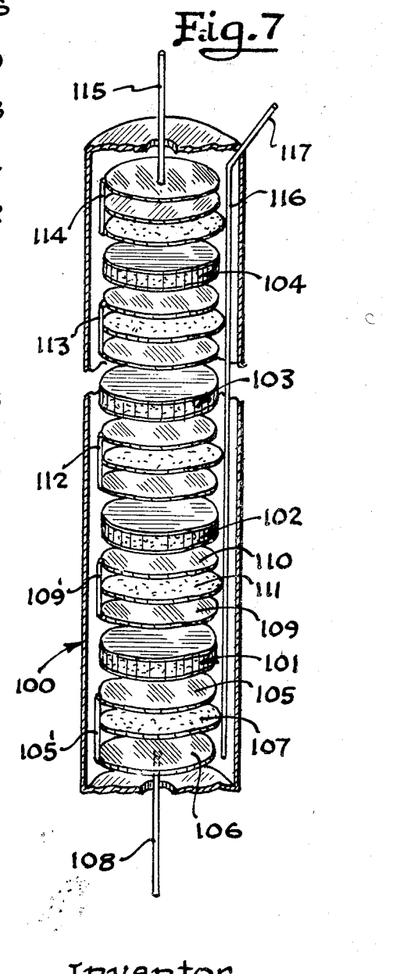
FIG. 7 is an exploded schematic diagram of a third modified form of the multiple cell battery shown in FIG. 4.

In FIG. 7 of the drawing is schematically shown a further modified form of a battery embodying the present invention and having a plurality of interconnected cell units with an internal heat source. Within an outer cylindrical container or casing 100 of silicone glass laminate or other suitable electrically non-conductive material are arranged the cell units 101, 102, 103 and 104, with each of the cell units being comprised of three superimposed layers or cell elements. The lower surface of cell 101 is in electrical contact with an electrically conductive metal disc 105 which preferably forms one end section of a dumbbell shaped member 105′ which has the other disc-shaped end section 106 folded over so as to enclose between the respective disc-shaped end sections 105 and 106, a disc 107 of heat-release material to form heat release assembly 105′ which is both a thermal and an electrical conductor adapted to interconnect adjacent cells. The dumbbell end section 106 has a lead-out member 108 of electrically conductive metal extending through a sealable outer covering (not shown). The upper surface of cell 101 is in electrical contact with a metal disc 109 which preferably forms one end section of a dumbbell-shaped member with the other disc-shaped section 10 being folded over so as to enclose between the respective disc-shaped end sections 109, and 110, a disc 111 of heat-release material and forms the heat-release assembly 109′. The dumbell-shaped end sections which are preferably formed of stainless steel or any suitable electrically conductive metal also serve to connect electrically in series the cell units 101 and 102. The cell units 102–103 and 103–104 are preferably electrically connected in series by dumbbell plus heat-release assemblies 112 and 113, respectively, which are disposed between the cells and each having a structure similar to assemblies 105′ and 109′. The upper surface of cell 104 is in electrical contact with a dumbbell plus heat paper assembly 114 having an electrically conducting leadout member 115 extending through a sealable cover. A strip 116 of combustible material contacts and interconnects all the heat-release discs and material present. One end 117 of strip 116 of combustible material extends through the sealable covering.

Figure 8:
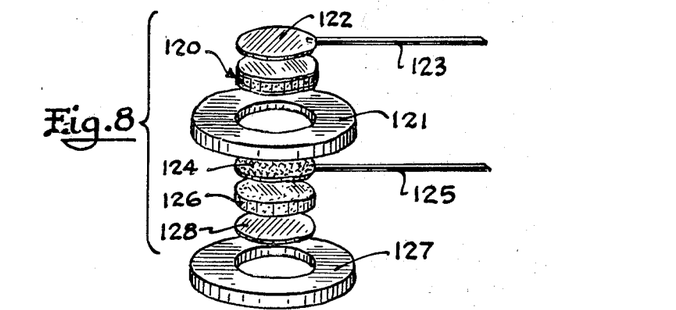
FIG. 8 is an exploded schematic diagram of a third modified form of the reserve-type battery shown in FIG. 1.
Figure 8A:
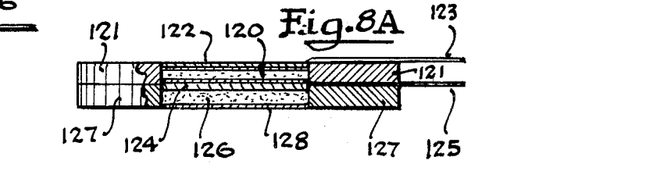
FIG. 8A is a schematic diagram of the battery of FIG. 8 showing the battery elements in operative relationship.

A simple reserve-type battery structure embodying the present invention is schematically shown in FIGS. 8 and 8A of the drawing and comprises a pelletized three-layer cell 120 which is placed in a silicone glass laminate ring 121 with the upper surface of the cell 120 in contact with an electrically conductive metal disc 122 which has an outwardly extending section 123 serving as one electrical contact for the cell, an electrically conductive metal screen 124 with an outwardly extending metal strip 125 which serves as the other electrical contact for the cell, a pellet 126 of a nitrogen-containing composition adapted to release ammonia gas on heating is disposed within a silicone glass laminate ring 127 and a metal support disc 128 contacts the lower surface of the pellet 126. The entire assembly is sealably enclosed in a suitable wrapper or container (not shown). A cell having the foregoing structure is activated by placing the cell in a heated oven or other environment maintained at a temperature sufficiently high to effect release of gaseous ammonia from the pellet 126 of nitrogen-containing compound which produces ammonia on heating.

Figures 9, 9A:
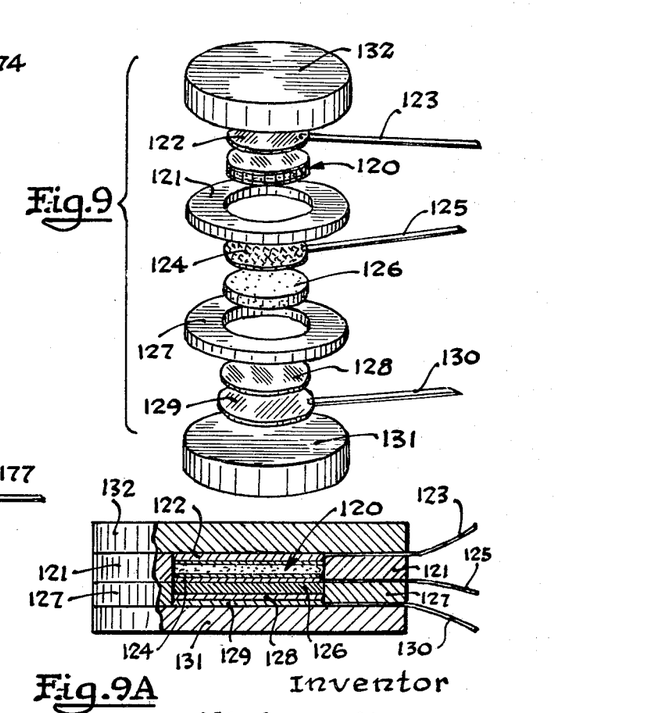
FIG. 9 is an exploded schematic diagram of a fourth modified form of the reserve-type battery shown in FIG. 1.
FIG. 9A is a schematic diagram of the battery of FIG. 9 showing the battery elements in operative relationship.

Another simple reserve-type battery structure embodying the present invention is schematically shown in FIGS. 9 and 9A of the drawing and comprises the same elements as FIG. 8 but having included therewith a heat-producing element 129 with an outwardly extending fuse section 130 and also thermally insulating discs 131 and 132 engaging the opposite ends of the battery cell structure, respectively.

Figure 10:
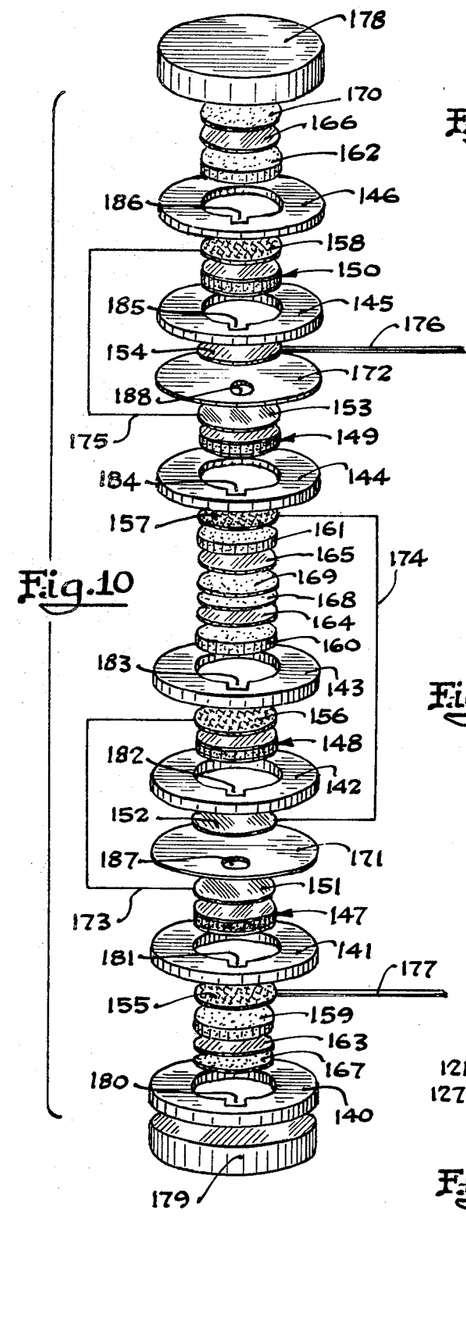
FIG. 10 is an exploded schematic diagram of a fourth modified form of the multiple cell battery shown in FIG. 4.

A reserve-type battery having an internal heat source and comprising a plurality of interconnected cells of the general type described in connection with FIG. 3 is schematically shown in FIG. 10 of the drawing, wherein several interconnected cells are positioned within a series of silicone glass laminate rings 140, 141, 142, 143, 144, 145 and 146, which form a case or cylindrical container of silicone glass laminate. Within these rings 141–146 are arranged the cell units 147, 148, 149 and 150, respectively, with each of the cell units being comprised of three superimposed pelletized layers or cell elements. One surface of each cell 147, 148, 149 and 150 is in contact with an electrically conducting metal disc or cell connector plate 151, 152, 153 and 154, respectively. The other surface of each cell 147, 148, 149 and 150 is in contact with an electrically conducting metal screen 155, 156, 157 and 158, respectively. A pellet of solid ammonia-releasing nitrogen-containing compound and/or mixture 159, 160, 161 and 162 is placed against each screen 155, 156, 157 and 158, respectively. The surface of the pellets 159, 160, 161 and 162 which is spaced from the screen, is in contact with a metal disc 163, 164, 165 and 166, respectively, whereas the other surface of the discs 163, 164, 165 and 166 is in contact with a disc of heat-producing material 167, 168, 169 and 170, respectively.

Discs of mica 171 and 172 are placed between discs 151, 152, 153 and 154, respectively, to electrically insulate the metal discs from each other. The connector strips of electrically conductive metal 173, 174 and 175 connect disc 151 and screen 156, disc 152 and screen 157, and disc 153 and screen 158, respectively, so as to electrically connect the cell elements in series. The metal strips are situated so as to run outside the silicon glass laminate discs to insulate said strips electrically from the remainder of the battery structure. The disc 154 and screen 155 are equipped with electrically conductive lead strips 176 and 177, respectively. Thermally insulating end discs 178 and 179 are located above and below the stack, respectively, and have as their main function the prevention of the environment surrounding the battery overheating when the discs of heat producing material 167, 168, 169 and 170 are ignited. The silicon glass laminate rings 140–146, together with the end discs, form a container for the battery assembly which prevents escape of the ammonia gas when clamped together.

A fuse of heat-release material (not shown for the sake of simplicity) passes through notches 180, 181, 182, 183, 184, 185 and 186, passes through holes 187 and 188 and extends out of the stack, thereby interconnecting the discs of heat-release material 167, 168, 169 and 170. The notches 181–186 also serve to facilitate the flow of gaseous ammonia through the assembly.

The following specific examples are for the purpose of further illustrating the present invention without, however, restricting the invention to the particular chemical components or arrangement and form of the several cell components used therein.

EXAMPLE 1

A single cell of the structure illustrated in FIGS. 1 and 1A was provided having a magnesium anode element 10, a copper cathode element 12, and the electrolyte element 16 comprising a mixture of $NH_4HCO_3$ and $LiNO_3$. The foregoing battery elements were assembled, as shown in FIGS. 1 and 1A, and the assembly was sealably wrapped in vinyl electrical tape. A clamp was applied to hold the elements together. The battery was activated by placing it in an oven at a temperature of 80° C. Under a load of 753 ohms, the cell having a diameter of ¾ inch developed a peak voltage of 0.71 volt, and the cell voltage remained above 80% of that peak for four days. The open circuit voltage was 1.28 volts, and the life to 80% of this peak was 17 days.

EXAMPLE 2

A single cell having the configuration illustrated in FIG. 3A was provided with the pelletized three-layer cell 20 having a powdered magnesium anode element 22, a mixture of solid $NH_4HCO_3$ and solid NaI as the electrolyte element 23, and a mixture of mercuric sulfate ($HgSO_4$), powdered carbon and "Thixcin" powdered wax was binding agent as the cathode element 24; and with nickel discs 25 and 27 disposed in contact with the opposite surfaces of the cell 20, and a disc 29 of heat producing material including a fuse of the same material in contact with nickel disc 27. The entire assembly, except for the fuse, was sealably wrapped in vinyl electrical tape and placed in a clamp. The battery was activated by igniting the fuse with match. Under a load of 690 ohms, the cell one inch in diameter produced 1.60 volts for 59 minutes (life to 80% of peak). The open circuit voltage was 1.80 volts, and the life to 80% of this peak was 350 minutes.

EXAMPLE 3

A battery consisting of four pelletized three-layer cells arranged generally as shown in FIG. 4 was provided with the three-layer cells 34, 35, 36 and 37 having a powdered magnesium anode layer, a mixture of NH$_4$HCO$_3$ and NH$_4$SCN as the electrolyte layer, and a mixture of mercuric sulfate, powdered graphite, and an inert binder as the cathode layer. The cells are disposed within a mica sleeve 33 in a steel container 30 with nickel connector plates of discs 38, 39, 40 and 41 and a nickel wire 42 welded to disc 41. The cover 43 was sealed to the container 30 by rolling the upper edge 31 of the container 30 over the cover 43 and soldering with liquid solder the joint thus formed. The battery was activated by placing it in an oven at 80° C. Under a load of 753 ohms, the four cells ⅜ inch in diameter produced 3.8 volts and remained above 80% of that peak voltage for 1.50 minutes. The open circuit voltage of the four cells was maintained above 80% of a peak of 6.3 volts for 2.00 minutes.

EXAMPLE 4

A battery consisting of four pelletized three-layer cells arranged as shown in FIG. 7 was provided with the pelletized three-layer cells 101, 102, 103 and 104 disposed within a silicone glass casing 100 and comprising a powdered magnesium anode layer, and electrolyte layer comprising a mixture of NH$_4$HCO$_3$ and NaI, and a cathode layer comprising a mixture of mercuric sulfate, powdered graphite, with an inert binder, and dumbbell-shaped heat-release assemblies 105', 109', 112, 113 and 114 which were formed of nickel and which enclose between the end sections thereof a disc of heat-release material. Nickel lead-out wires 108 and 115 were attached to the opposite end discs. The entire assembly, except for the fuse, was sealably wrapped with vinyl electrical tape and placed in a clamp. The battery was activated by igniting the fuse with a match. The four cells having a one inch diameter produced 2.7 volts under a load of 690 ohms and remained above 80% of that peak voltage for 6.35 minutes. The open circuit voltage of the four cells was maintained above 80% of a peak of 5.01 volts for 1200 minutes (20 hours).

EXAMPLE 5

A battery consisting of a single cell of the structure illustrated in FIGS. 1 and 1A was provided having the electrolyte element 16 comprised of a mixture of (NH$_4$)$_2$HPO$_4$ and LiNO$_3$, a magnesium anode element 10, and a copper cathode element 12. The entire assembly was sealably wrapped in vinyl electrical tape and placed in a clamp. The battery was activated by placing it in an oven at 124° C. The cell 0.75 inch in diameter produced 1.42 volts under a load of 753 ohms and remained above 80% of that peak voltage for 7 minutes. The open circuit voltage was maintained above 80% of a peak of 1.47 volts for 13 minutes.

EXAMPLE 6

A battery consisting of a single cell of the configuration illustrated in FIGS. 3 and 3A was provided having the pelletized three-layer cell 20 with a powdered magnesium anode element 22, an electrolyte element 23 comprised of a mixture of (NH$_4$)$_2$HPO$_4$ and NaI, and a cathode element 24 comprised of a mixture of HgSO$_4$, powdered graphite, and "Paracin" powdered wax as a binder. The remaining parts were as in Examples 2 and 2A. The entire assembly, except for the fuse, was sealably wrapped in vinyl electrical tape and placed in a clamp. The battery was activated by igniting the fuse with a match. The cell one inch in diameter remained above 80% of an open circuit peak voltage of 1.27 volts for 2.83 minutes.

EXAMPLE 7

A battery consisting of four pelletized three-layer cells arranged as shown in FIG. 6 was provided having disposed within a silicone glass laminate case 80 the four three-layer cells 81, 82, 83 and 84 with the anode layer thereof comprised of a mixture of (NH$_4$)$_2$HPO$_4$ and powdered magnesium, the electrolyte layer comprised of KSCN, and the cathode layer comprised of a mixture of HgSO$_4$, powdered graphite and an inert binder. Nickel conductor discs 85, 86, 87, 88 and 90 interconnected the cells, and nickel wires 89 and 91 were welded to the nickel discs 88 and 90, respectively. The entire assembly was sealably wrapped with vinyl electrical tape and placed in a clamp. The battery was activated by placing it in an oven at 120° C. The four cells one inch in diameter maintained an open circuit voltage above 80% of a peak of 1.61 volts for 7 minutes.

EXAMPLE 8

A battery was provided consisting of four pelletized three-layer cells arranged generally as shown in FIG. 10 but wherein the discs 167, 168, 169 and 170 of heat-producing material and conductor discs 164 and 165 were omitted. The ammonia releasing pellets 159, 160, 161 and 162 were composed of (NH$_4$)$_2$HPO$_4$; the screens 155, 156, 157 and 158 were formed of stainles steel; the connector plates 151, 152, 153 and 154, and the discs 163 and 166 were formed of nickel. The pelletized three-layer cells 147, 148, 149 and 150 have the anode element formed of powdered magnesium, the electrolyte element composed of LiNO$_3$, and the cathode element composed of a mixture of HgSO$_4$, powdered graphite and an inert binder. The entire assembly was sealably wrapped in vinyl electrical tape and placed in a clamp. The battery was activated by placing it in a furnace at 270° C. The four cells 0.75 inch in diameter under a load of 695 ohms maintained a voltage above 80% of a peak of 3.35 volts for 2.42 minutes.

EXAMPLE 9

A battery consisting of four pelletized three-layer cells arranged as shown in FIG. 7 was provided, wherein the three-layer cells 101, 102, 103 and 104 had as the anode a mixture of (NH$_4$)$_2$HPO$_4$ and powdered magnesium as the anode element, KSCN as the electrolyte element, and a mixture of HgSO$_4$, powdered graphite and an inert binder as the cathode element. The remaining parts were as in Example 4. The entire assembly, except for the fuse, was sealably wrapped in vinyl electrical tape and placed in a clamp. The battery was activated by igniting the fuse with a match. The four cells one inch in diameter maintained an open circuit voltage above 80% of a peak of 2.80 volts for 26.2 minutes.

EXAMPLE 10

A battery consisting of a single cell having the configuration shown in FIGS. 8 and 8A was provided in which discs 122 and 128 were nickel; screen 124 was stainless steel; the ammonia producing pellet 126 was (NH$_4$)$_2$SO$_4$ and the pelletized three-layer cell 120 used powdered magnesium as the anode, LiNO$_3$ as the electrolyte, and the cathode was composed of a mixture of HgSO$_4$, powdered graphite, and an inert binder. The entire assembly was sealably wrapped in vinyl electrical tape and placed in a clamp. The battery was activated by placing it in a furnace at a temperature of 275° C. The cell of 0.75 inch in diameter maintained an open circuit voltage above 80% of a peak of 1.52 volts for 4.5 minutes.

A cell identical to the foregoing, except for the substitution of NaI for LiNO₃ as the electrolyte element, produced 0.11 volt under a load of 695 ohms, and remained above 80% of this peak for 2.75 minutes.

EXAMPLE 11

A battery consisting of a single cell of the configuration shown in FIGS. 9 and 9A was provided in which discs 122 and 128 were nickel; screen 124 was stainless steel; the ammonia-releasing pellet 126 was composed of $(NH_4)_2SO_4$; the pelletized three-layer cell 120 used compressed powdered magnesium as the anode element, KI as the electrolyte element, and a mixture of $HgSO_4$, powdered graphite, and an inert binder as the cathode element; and the heat-releasing disc 129 was formed of conventional heat-release material with a fuse 130 connected therewith. The rings 121 and 127 and the end sections 131 and 132 were formed of silicone glass laminate. The entire assembly except for the fuse, was sealably enclosed with vinyl electrical tape and placed in a clamp. The battery was activated by igniting the fuse with a match. The cell of 0.75 inch in diameter maintained an open circuit voltage above 80% of a peak of 1.87 volts for 18.43 minutes.

EXAMPLE 12

A battery was provided consisting of three cells arranged generally as shown in FIG. 4, but with the cell 34 and the conductor disc 38 of FIG. 4 omitted, wherein the three-layer cells 35, 36 and 37 had the anode layer formed of powdered magnesium, the electrolyte layer formed of a mixture of $(NH_4)_2SO_4$, $NH_4Cl$, and NaSCN, and the cathode layer formed of a mixture of $HgSO_4$, powdered graphite, and an inert binder. The remaining parts were as in Example 3. The entire assembly with the cover in place was sealably enclosed in a plastic container with an epoxy resin. The battery was activated by placing it in a furnace at 280° C. Three cells 0.375 inch in diameter produced 3.6 volts under a load of 753 ohms, and remained above 89% of that peak voltage for 1.0 minute. The open circuit voltage of the three cells remained about 80% of the peak of 5.2 volts for 4.0 minutes.

EXAMPLE 13

A battery consisting of four cells arranged as shown in FIG. 10 was provided, wherein the discs 151, 152, 153 and 154 were nickel; the screens 155, 156, 157 and 158 were stainless steel; the ammonia releasing pellets 159, 160, 161 and 162 were comprised of $(NH_4)_2SO_4$; connector strips 173, 174, 175, 176 and 177 were formed of nickel ribbon; and the pelletized three-layer cells 147, 148, 149 and 150 had as the anode layer powdered magnesium, the electrolyte layer was composed of lithium nitrate, and the cathode layer was comprised of a mixture of $HgSO_4$, powdered graphite, and an inert binder. The rings 140–146 and end discs 178–179 were formed of silicone glass laminate. The entire assembly, except for the portion of the fuse external to the stack, was sealably wrapped with vinyl electrical tape and placed in a clamp. The battery was activated by igniting the fuse with a match. The four cells ¾ inch in diameter produced 3.24 volts under a 690 ohm load and remained above 80% of this peak for 1.0 minute.

A battery identical to the foregoing, except for the substitution of KNO₃ for LiNO₃ as electrolyte element, maintained an open circuit voltage above 80% of a peak of 8.81 volts for 16.70 minutes.

EXAMPLE 14

A battery consisting of a single cell in the configuration shown in FIGS. 3 and 3A was provided, wherein the pelletized three-layer cell 20 comprised the anode element 22 of powdered magnesium, the electrolyte element 23 was comprised of a mixture of ammonium zirconium fluoride, LiOH, and NaI, and the cathode element 24 was comprised of a mixture of $HgSO_4$, powdered graphite, and an inert binder. The heat-releasing element 29 was omitted, and the remaining parts were as in Example 2. The entire assembly was sealably wrapped in vinyl electrical tape and placed in a clamp. The battery was activated by placing it in a furnace at 220° C. The cell 0.75 inch in diameter produced 0.37 volt under a 695 ohm load and remained above 80% of that peak voltage for 1.75 minutes. The open circuit voltage remained above 80% of the peak voltage of 1.48 volts for 3.25 minutes.

EXAMPLE 15

A battery consisting of a single cell of the structure shown in FIGS. 2 and 2A was provided, wherein, the electrolyte element 16 was comprised of a mixture of ammonium zirconium fluoride, LiOH and NaI, the anode element was formed of magnesium and the cathode element was formed of copper. The entire assembly, except for the fuse, was sealably wrapped in vinyl electrical tape and placed in a clamp. The battery was activated by igniting the disc 18 of conventional heat-producing material and fuse 19 ignited with a match. The cell 0.75 inch in diameter maintained an open circuit voltage above 80% of the peak of 0.58 volt for 7.83 minutes.

EXAMPLE 16

A battery consisting of four cells arranged as shown in FIG. 6 was provided, wherein the three-layer cells 81, 82, 83 and 84 had the anode element formed of powdered magnesium, the electrolye element formed of a mixture of ammonium zirconium fluoride, LiOH and NaI, and the cathode element formed of a mixture of $HgSO_4$, powdered graphite, and an inert binder. The remaining parts were as in Example 7. The entire assembly was sealably wrapped with vinyl electrical tape and placed in a clamp. The battery was activated in a furnace at 240° C. The four cells ¾ inch in diameter maintained an open circuit voltage above 80% of the peak voltage of 5.8 volts for 5.25 minutes. The four cells identical with the foregoing, except for the substitution of KNO₃ for NaI in the electrolyte element, produced a peak voltage of 0.55 volt under a load of 695 ohms and remained above 80% of that peak for 2.25 minutes.

EXAMPLE 17

A battery consisting of four cells arranged as shown in FIG. 7 was provided, wherein the pelletized three-layer cells 101, 102, 103 and 104 had powdered magnesium as the anode layer, a mixture of ammonium zirconium fluoride, LiOH and NaI as the electrolyte layer, a mixture of $HgSO_4$, powdered graphite and an inert binder as the cathode layer. The remaining parts were as in Example 4. The entire assembly, except for the fuse, was sealably wrapped with vinyl electrical tape and placed in a clamp. The battery was activated by igniting the fuse with a match. The four cells 0.75 inch in diameter maintained a voltage above 80% of the peak voltage of 4.04 volts for 35.5 minutes.

EXAMPLE 18

A battery consisting of a single cell of the general configuration shown in FIG. 3A, but without the disc 29 of heat-producing material, was provided, wherein the three-layered pelletized cell 20 had the anode layer 22 thereof comprised of a mixture of ammonium fluoborate, LiOH and LiNO₃, and the cathode layer 24 comprised of a mixture of $HgSO_4$, powered graphite and an inert binder. The remaining parts were as in Example 2. The entire assembly was sealably wrapped with vinyl electrical tape and placed in a clamp. The battery was activated py placing it in a furnace at 290° C. The cell 0.75 inch in diameter maintained an open circuit voltage above 80% of the peak of 1.1 volts for 1.25 minutes.

When the ammonium fluoborate and LiOH were placed in a separate pellet within the assembly, a cell 0.75 inch in diameter under a load of 695 ohms maintained a voltage above 80% of a peak of 0.65 volt for 1.75 minutes.

EXAMPLE 19

A battery consisting of a single cell of the configuration shown in FIGS. 2 and 2A was provided, wherein the electrolyte element 16 was comprised of a mixture of ammonium fluoborate, LiOH and NaI, with the remaining parts as in Example 15. The entire assembly, except for the fuse, was sealably wrapped in vinyl electrical tape and placed in a clamp. The battery was activated by igniting the fuse with a match. A single cell 0.75 inch in diameter maintained an open circuit voltage above 80% of a peak of 0.90 volt for 2.47 minutes.

EXAMPLE 20

A battery consisting of four cells arranged as shown in FIG. 6 was provided, wherein the pelletized three-layer cells 81, 82, 83 and 84 used as an anode layer powdered magnesium with the electrolyte layer being formed of a mixture of ammonium fluoborate, NaOH and $LiNO_3$, and the cathode layer being formed of a mixture of $HgSO_4$, powered graphite and an inert binder. The remaining parts were as in Example 7. The entire assembly was sealably wrapped in vinyl electrical tape and placed in a clamp. The battery was activated by placing it in a furnace at 240° C. The four cells 0.75 inch in diameter maintained an open circuit voltage above 80% of the peak value of 6.90 volts for 2.50 minutes.

Four cells identical to the foregoing, except for the substitution of a mixture of ammonium fluororate, LiOH and $KNO_3$ for the above mentioned electrolyte layer, under a load of 695 ohms, maintained a voltage above 80% of a peak of 1.58 volts for 2.92 minutes.

EXAMPLE 21

A battery consisting of four cells arranged as shown in FIG. 7 was provided, wherein the pelletized three-layered cells 101, 102, 103 and 104 have the anode layer thereof former of powdered magnesium, the electrolyte layer formed of a mixture of ammonium fluoborate, NaOH and $LiNO_3$, and the cathode layer formed of a mixture of $HgSO_4$, powdered graphite and an inert binder. The remaining parts were as in Example 4. The entire assembly, except for the fuse, was sealably wrapped in vinyl electrical tape. The battery was activated by igniting the fuse with a match. The four cells with a diameter of 0.75 inch maintained an open circuit voltage about 80% of the peak of 5.82 volts for more than 450 minutes.

EXAMPLE 22

A battery consisting of a single cell of the structure illustrated in FIGS. 1 and 1A was provided, wherein the electrolyte element 16 was comprised of a mixture of $Cu(NH_3)_4Cl_2 \cdot H_2O$ and $NH_4SCN$, the anode was formed of magnesium, and the cathode was formed of copper. The entire assembly was sealably wrapped in vinyl electrical tape and placed in a clamp. The battery was activated by placing it in an oven at 76° C. The cell 0.75 inch in diameter maintained an open circuit voltage above 80% of a peak of 1.05 volts for more than 5 hours. Under a load of 191 ohms the cell maintained more than 80% of the peak voltage of 0.28 volt for more than 5 minutes.

EXAMPLE 23

A battery consisting of a single cell of the configuration shown in FIGS. 3 and 3A was provided, wherein the pelletized three-layer cell 20 had the anode element 22 thereof formed of powdered magnesium, the electrolyte element 33 formed of NaI, and the cathode element 24 formed of a mixture of $Cu(NH_3)_4Cl_2 \cdot H_2O$ and powdered graphite. The remaining parts were as in Example 2. The entire assembly, except for the fuse, was sealably wrapped in vinyl electrical tape and placed in a clamp. The battery was activated by igniting the fuse with a match. The cell of a diameter of 0.75 inch maintained an open circuit voltage about 80% of the peak of 1.72 volts for 3.90 minutes.

EXAMPLE 24

A battery consisting of four three-layer cells arranged as shown in FIG. 6 was provided, wherein the pelletized three-layer cells 81, 82, 83 and 84 had the anode layer thereof formed of powdered magnesium, the electrolyte layer formed of KSCN, and the cathode layer formed of a mixture of $Cu(NH_3)_4Cl_2 \cdot H_2O$ and powdered graphite. The remaining parts were as in Example 7. The entire assembly was sealably wrapped in vinyl electrical tape and then placed in a clamp. The battery was activated by placing it in a furnace at 140° C. The four cells of a diameter of 0.75 inch maintained an open circuit voltage above 80% of a peak voltage of 2.81 volts for 14.0 minutes.

EXAMPLE 25

A battery was provided having a structure and composition as in Example 24, except that $LiNO_3$ was substituted for KSCN as the electrolyte element, and the battery was activated in a furnace having a temperature of 200° C. instead of 140° C. The four cells having a diameter of 0.75 inch when under a load of 695 ohms maintained a voltage above 80% of the peak voltage of 1.25 volts for 3.42 minutes.

EXAMPLE 26

A battery consisting of four pelletized cells arranged as shown in FIG. 7 was provided, wherein the three-layer cells 101, 102, 103 and 104 had the anode layer formed of powdered magnesium, the electrolyte layer formed of powdered magnesium, the electrolyte layer formed of $LiNO_3$, and the cathode layer formed of a mixture of $Cu(NH_3)_4Cl_2 \cdot H_2O$ and powdered graphite. The remaining parts were as in Example 4. The entire assembly, except for the fuse, was sealably wrapped with vinyl electrical tape and placed in a clamp. The cell was activated by igniting the fuse with a match. The four cells having a diameter of 0.75 inch maintained an open circuit voltage about 80% of a peak of 2.96 volts for 8.38 minutes.

EXAMPLE 27

A battery consisting of a single cell of the structure shown in FIGS. 1 and 1A was provided, wherein the electrolyte element 16 was comprised of a mixture of $[(NH_3)_5CoCl]Cl_2$, NaOH, and $LiNO_3$, the anode was formed of magnesium, and the cathode was formed of copper. The entire assembly was sealably wrapped with vinyl electrical tape and placed in a clamp. The battery was activated by placing it in a furnace at 230° C. The cell having a diameter of 0.75 inch maintained an open circuit voltage above 80% of a peak of 0.90 volt for 6 minutes.

EXAMPLE 28

A battery consisting of a single cell of the configuration shown in FIGS. 8 and 8A was provided, wherein the ammonia releasing pellet 126 was comprised of a mixture of $[(NH_3)_5CoCl]Cl_2$ and LiOH, the three-layered cell 120 had an anode layer formed of powdered magnesium, an electrolyte layer formed of $LiNO_3$, and a cathode layer formed of a mixture of $HgSO_4$, powdered graphite and an inert binder. The remaining parts were as in Example 10. The entire assembly was sealably wrapped with vinyl electrical tape and then placed in a clamp. The battery was activated by placing it in a furnace at 225° C. The cell 0.75 inch in diameter when under a load of 695 ohms maintained a voltage above 80% of a peak of 0.35 volts for 1.50 minutes.

EXAMPLE 29

A battery consisting of a single cell of the configuration shown in FIGS. 9 and 9A was provided, wherein the ammonia releasing pellet 126 was comprised of a mixture of $[(NH_3)_5CoCl]Cl_2$ and LiOH, the pelletized three-layer cell 120 had the anode layer formed of powdered magnesium, an electrolyte layer formed of $LiNO_3$, and the cathode layer formed of a mixture of $HgSO_4$, powdered graphite and an inert binder. The remaining parts were as in Example 11. The entire assembly, except for the fuse, was sealably wrapped with vinyl electrical tape and placed in a clamp. The battery was activated by igniting the fuse with a match. The cell 0.75 inch in diameter maintained an open circuit voltage above 80% of a peak voltage of 1.75 volts for 13.72 minutes.

EXAMPLE 30

A battery consisting of four cells arranged as shown in FIG. 6 was provided, wherein the three-layer pelletized cells 81, 82, 83 and 84 had an anode layer formed of powdered magnesium, an electrolyte layer formed of a mixture of $[(NH_3)_5CoCl]Cl_2$, NaOH, and $LiNO_3$, and the cathode layer formed of a mixture of $HgSO_4$, powdered graphite and an inert binder. The remaining parts were as in Example 7. The entire assembly was sealably wrapped in vinyl electrical tape and placed in a clamp. The four cells 0.75 inch in diameter under a load of 695 ohms maintained a voltage above 80% of peak voltage for 2.50 minutes. An open circuit voltage above 80% of the peak voltage was maintained for 5.00 minutes. The peak voltage obtained under load was 1.50 volts; maximum open circuit voltage was 3.65 volts.

EXAMPLE 31

A battery consisting of four cells arranged as in FIG. 10 was provided, wherein the ammonia releasing pellets 159, 160, 161 and 162 were comprised of a mixture of $[(NH_3)_5CoCl]Cl_2$ and LiOH, and the three-layer pelletized cells 147, 148, 149 and 150 had the anode layer formed of powdered magnesium, the electrolyte layer formed of $LiNO_3$, and the cathode layer formed of a mixture of $HgSO_4$, powdered graphite and an inert binder. The remaining parts were as in Example 13. The whole assembly, except for the fuse, was sealably wrapped in vinyl electrical tape and placed in a clamp. The battery was activated by igniting the fuse with a match. The four cells 0.75 inches in diameter produced a peak open circuit voltage of 7.35 volts. The voltage was maintained above 80% of the peak voltage for 6.63 minutes.

EXAMPLE 32

A battery consisting of a single cell of the structure illustrated in FIGS. 1 and 1A was provided, wherein the electrolyte element 16 comprised a mixture of $Mg_3N_2$, $MgCl_2 \cdot 6H_2O$, and $LiNO_3$, the anode element was formed of magnesium, and the cathode element was formed of copper. The entire assembly was sealably wrapped with vinyl electrical tape and then placed in a clamp. The battery was activated by placing it in a furnace at 204° C. The cell of 0.75 inch in diameter maintained a voltage of above 80% of 0.90 volt under a load of 695 ohms for more than 1.25 minutes. The open circuit voltage was maintained above 80% of a peak of 1.10 volts for 10.25 minutes.

EXAMPLE 33

A battery consisting of a single cell of the configuration shown in FIGS. 9 and 9A was provided, wherein the ammonia producing pellet 126 was comprised of a mixture of $Mg_3N_2$ and $MgCl_2 \cdot 6H_2O$, and the pelletized three-layer cell 120 had the anode layer formed of powdered magnesium, the electrolyte layer formed of $LiNO_3$, and the cathode layer formed of a mixture of $HgSO_4$, powdered graphite and an inert binder. The remaining parts were as in Example 11. The entire assembly, except for the fuse, was sealably wrapped with vinyl electrical tape and placed in a clamp. The battery was activated by igniting the fuse with a match. A single cell 0.75 inch in diameter produced an open circuit voltage of 1.97 volts. After 17 hours the voltage remained at 88.5% of the peak.

EXAMPLE 34

A battery was provided consisting of four cells arranged generally as shown in FIG. 10, but having the parts 167, 164, 168, 169, 165 and 170 omitted. The ammonia producing pellets 159, 160, 161 and 162 were comprised of a mixture of $Mg_3N_2$ and $MgCl_2 \cdot 6H_2O$, the pelletized three-layered cell 120 had an anode layer formed of powdered magnesium, and electrolyte layer formed of $LiNO_3$, and cathode layer formed of a mixture of $HgSO_4$, powdered graphite and an inert binder. The remaining parts were as in Example 13. The entire assembly was sealably wrapped with vinyl electrical tape and then placed in a clamp. The battery cells 0.75 inch in diameter upon activation in a furnace at 245° C. maintained an open circuit voltage above 80% of a peak at 6.40 volts for 1.50 minutes. When the battery was formed with cells having a diameter of 0.375 inch, upon activation in a furnace at 260° C., maintained an open circuit voltage above 80% of a peak of 2.90 volts for 2.25 minutes.

EXAMPLE 35

A battery consisting of four cells arranged as shown in FIG. 10 was provided, wherein the ammonia producing pellets 159, 160, 161 and 162 were formed of a mixture of $Mg_3N_2$ and $MgCl_2 \cdot 6H_2O$, the pelletized three-layer cells 147, 148, 149 and 150 had the anode layer formed of powdered magnesium, the electrolyte layer formed of $LiNO_3$, and the cathode layer formed of a mixture of $HgSO_4$, powdered graphite and an inert binder. The remaining parts were as in Example 13. The entire assembly, except for the fuse, was sealably wrapped with vinyl electrical tape and placed in a clamp. The battery was activated by igniting the fuse with a match. The battery with the four cells having a diameter of 0.375 inch maintained an open circuit voltage above 80% of a peak of 7.63 volts for 53.42 minutes. When the four cells had a diameter of 0.75 inch, the battery maintained a voltage above 80% of a peak of 4.78 volts for 1.22 minutes under a load of 690 ohms.

It will be understood that modifications and variations may be effected without departing from the scope of the novel concepts of the present invention, but it is understood that this application is to be limited only by the scope of the appended claims.

I claim:

1. A thermally activated ammonia battery assembly comprising a battery cell disposed within an enclosure and including as battery cell elements an anode element, a cathode element, and an electrolyte element in direct contact with said anode and cathode elements, said electrolyte element being formed of a dry finely divided non-conductive electrolyte material which when exposed to gaseous ammonia forms an electrolyte solution, and having contacting said electrolyte element a solid nitrogen-containing composition which on heating to a predetermined temperature below the decomposition temperature of said electrolyte material forms ammonia in situ within said battery cell for direct absorption by said electrolyte material and activates the cell by forming an ionically conductive electrolyte.

2. A thermally activated ammonia battery as in claim 1, wherein said nitrogen-containing composition is mixed directly, with said finely divided electrolyte material forming said electrolyte element.

3. A thermally activated ammonia battery as in claim 1, wherein said nitrogen-containing composition is in the form of a pellet disposed in said battery cell.

4. A thermally activated ammonia battery as in claim 1, wherein said battery cell has an integral component thereof a heat-released means adapted to heat said nitrogen-containing composition to said predetermined temperature and form said gaseous ammonia.

5. A thermally activated ammonia battery as in claim 2, wherein the said battery cell elements are in the form of superimposed layers of compressed finely divided material.

6. A thermally activated ammonia battery as in claim 5, wherein said anode, cathode and electrolyte elements are compressed in the form of a unitary three-layered pellet.

7. A thermally activated ammonia battery as in claim 6, having a plurality of said three-layered pellets electrically interconnected and with a plurality of thermally interconnected heat-release means disposed within said enclosure adapted to heat said electrolyte element to said predetermined temperature.

8. In a thermally activated ammonia battery assembly having one or more interconnected battery cell units each comprising an anode, a cathode and an electrolyte element formed of compressed superimposed layers of finely divided material and disposed within a battery enclosure, the improvement comprising; a battery assembly with each cell unit thereof having as the electrolyte element a compressed mixture of particles of a dry solid electrically non-conductive finely divided electrolyte material which when exposed to gaseous ammonia becomes a conductive electrolyte and a dry finely divided solid nitrogen-containing composition adapted to form ammonia in situ within said cell when heated to a predetermined temperature below the decomposition temperature of said salt; whereby said non-conductive electrolyte material is transformed into an ionically conductive electrolyte when said electrolyte element is heated to said predetermined temperature.

References Cited
UNITED STATES PATENTS

| | | | |
|---|---|---|---|
| 2,948,767 | 8/1960 | Johnson et al. | 136—113 X |
| 2,980,103 | 4/1961 | Scribner et al. | 136—90 X |
| 2,992,289 | 7/1961 | Meyers | 136—90 |
| 3,239,384 | 3/1966 | Meyers | 136—90 |
| 3,404,037 | 10/1968 | McCarter | 136—83 |

ALLEN B. CURTIS, Primary Examiner

U.S. Cl. X.R.

136—83, 90